United States Patent [19]

Kuecken

[11] Patent Number: 5,581,707
[45] Date of Patent: Dec. 3, 1996

[54] SYSTEM FOR WIRELESS COLLECTION OF DATA FROM A PLURALITY OF REMOTE DATA COLLECTION UNITS SUCH AS PORTABLE BAR CODE READERS

[75] Inventor: John A. Kuecken, Pittsford, N.Y.

[73] Assignee: PSC, Inc., Webster, N.Y.

[21] Appl. No.: 281,501

[22] Filed: Jul. 27, 1994

[51] Int. Cl.⁶ ........................................... G06F 13/00
[52] U.S. Cl. ........................................... 395/200.13
[58] Field of Search ........................... 364/200, 250, 364/DIG. 1 MS File, DIG. 2 MS File; 395/275, 325, 800, 200.01, 200.09, 200.1, 200.13; 370/95.1, 95.2, 109; 340/825.06, 825.07, 825.08, 825.71, 825.72, 825.73, 286.01

[56] References Cited

U.S. PATENT DOCUMENTS

| | | | |
|---|---|---|---|
| 4,247,908 | 1/1981 | Lockhart | 364/DIG. 2 |
| 4,255,816 | 3/1981 | Grunza | 455/277 |
| 4,513,412 | 4/1985 | Cox | 370/29 |
| 4,704,733 | 11/1987 | Kawano | 455/16 |
| 4,747,160 | 5/1988 | Bossard | 455/33 |
| 4,924,462 | 5/1990 | Sojka | 370/95.2 |
| 5,023,438 | 6/1991 | Watsuki | 235/472 |
| 5,023,929 | 6/1991 | Call | 455/2 |
| 5,029,183 | 7/1991 | Tymes | 375/1 |
| 5,031,098 | 7/1991 | Miller | 364/405 |
| 5,040,175 | 8/1991 | Tuch | 370/85.2 |
| 5,070,536 | 12/1991 | Mahany | 455/67 |
| 5,103,461 | 4/1992 | Tymes | 375/1 |
| 5,107,100 | 4/1992 | Shepard | 235/472 |
| 5,142,550 | 8/1992 | Tymes | 375/1 |
| 5,157,687 | 10/1992 | Tymes | 375/1 |
| 5,161,252 | 11/1992 | Higuchi | 455/78 |
| 5,179,569 | 1/1993 | Sawyer | 375/1 |
| 5,195,183 | 3/1993 | Miller | 395/275 |
| 5,210,753 | 5/1993 | Natarajan | 370/95.1 |
| 5,218,188 | 6/1993 | Hanson | 235/375 |
| 5,260,554 | 11/1993 | Grodevant | 235/462 |
| 5,280,498 | 1/1994 | Tymes | 375/1 |
| 5,322,991 | 6/1994 | Hanson | 235/472 |

OTHER PUBLICATIONS

Motorola Semiconductor Technical Data 3 pages circa 1990.
Motorola Telecommunications Device Data 2 pages circa 1990.

Primary Examiner—Robert B. Harrell
Attorney, Agent, or Firm—Wolf, Greenfield & Sacks, P.C.

[57] ABSTRACT

In order to collect data messages at a base station which is in radio communications with portable data collection terminals, such as bar code readers, that may move between different locations, all remote from the base station, a set of successive polling messages are broadcast from the base station addressed to different individual remote units during successive polling cycles. Increases in speed of polling cycles are obtained by eliminating from the polling cycle messages addressed to remote units which are turned off, or are inactive for a time since the unit recently sent data to the base station. During the last polling cycle in a set, the base station transmits acknowledgment of the collection of valid data to all of the units which have transmitted data. The time required for data collection depends upon the activity of the units and complex error and collision avoidance codes are not required. The system is also adapted for use with polarization diversity radio transmission whereby the one of a pair of antennas disposed at the base station in polarization diversity relationship (orthogonal to each other) can be selected for transmission for each units next poll depending upon which of the antennas received the strongest poll response signal from that unit on the previous cycle of polling signals.

46 Claims, 6 Drawing Sheets

SYSTEM FOR WIRELESS COLLECTION OF DATA FROM A PLURALITY OF REMOTE DATA COLLECTION UNITS SUCH AS PORTABLE BAR CODE READERS

BACKGROUND

The present invention relates to the data collection systems for collection of data, which is picked up at a plurality of different sites, is transferred to a central or base station for storage, display for data processing purposes, and particularly which pickup of the data is carried out by portable data units which may be located at different sites remote from the base station and communicate therewith by wireless exchange of messages, such as by radio transmissions.

The invention is especially suitable for the collection of data read by bar code scanners (sometimes bar code readers) which may move from place to place so as to read labels on items at different locations, for example, in a warehouse or factory. The invention provides an improved communications protocol which is especially adapted for wireless collection of data from bar code scanners or other data collection terminals. The protocol may also be suitable for use with other communication networks where robust reliable and effective data communication is desired.

In order to provide for robustness in communication of messages, there is networking multiplexing and communication modes have been proposed. One proposal, which has been made for collection of data from remote bar code scanners by radios involved, involve selective, interactive communication between a base station and the remote units. Spread spectrum techniques have been used together with protocols for sensing potential collisions or simultaneous communication between the central station and different units. See Tymes, U.S. Pat. No. 5,029,183 issued Jul. 2, 1991 and various patents which are divisions continuations, etc. therefrom, such as U.S. Pat. No. 5,157,687, issued Oct. 20, 1992 and U.S. Pat. No. 5,280,498 issued Jan. 18, 1994.

SUMMARY OF THE INVENTION

The present invention provides robust communication by implementing a tolling protocol which is dynamic in that the polling rate depends upon the data messages from the remote units which are ready for transmission to the central collection station and minimizes the time for polling the compliment of remote units by replacing polling messages addressed to units which are inactive or should be inactive, as when they have just transmitted a data message and should be in the process of collecting other data—reading a bar code on another item, or simply turned off or otherwise not in use. The base station and the remote units have wireless communication capability (e.g., radio transceivers operating on the same radio channel or frequency) the base station utilizes two antennas in polarization diversity relationship (e.g., orthongonal to each other). Transmissions to the remote unit are made using the antenna from which the strongest signal has been received from that unit on the previous poll. Since the polling cycles are closely spaced, the remote unit can be expected to transmit on the same polarization because insufficient time between polling cycles is available for displacement of the remote unit to a location where the polarization of signal received by the base station is likely to have changed.

Accordingly, it is another feature of the invention, which is in part attributable to the improved protocol by which data is exchanged between the remote units and the base station, is that the cost of the system of wireless data collection is minimized in that both the major part of the intelligence of the system and the diversity polarization enhancement attributes thereof are provided for in the base station. The remote portable units are not significantly increased in cost by virtue of adding wireless communication facilities thereto. The overall cost of the system, since there are many portable units for each base station, is minimized.

Accordingly, it is an object of the present invention to provide an improved system (method and apparatus) which implements a robust data communications protocol which optimizes data communication speed (rates) while maintaining reliability and which system is especially adapted for wireless data communication.

It is a further object of the present invention to provide an improved system for data communication which implements an improved timed division multiplexing protocol which is especially adopted for radio communications between a base and a plurality of data collection units, which may be at different locations remote from the base.

It is a still further object of the present invention to provide an improved system for wireless data communication which avoids collisions, namely simultaneous transmissions which occupy the same time interval and which can easily occur in a wireless system since remote units may be out of communicating relationship and unable to talk to each other.

It is a still further object of the present invention to provide an improved data communication system which enables high speed interrogation of data pickup units by: (a) reducing the speed of interrogation to permit transmission of data from units which have collected data and not from units which do not have data available for transmission to a base station; (b) saving time by not interrogating inactive units; and (c) saving time by temporarily skipping interrogation of units which have collected transmitted data and are unlikely to have new data, thereby, enabling successive units to replace the skipped units and shortening the time required for a cycle of interrogations and, therefore, the data transmission rate of the system;

It is a further object of the present invention to provide an improved system for wireless radio communication between a base and a plurality of remote units which implements a cyclic communication protocol whereby signals are exchanged between the base and successive ones of the remote units (on successive polling cycles) using polarization diversity to transmit from the base to each remote unit with the same polarization as the optimum signal received from that remote on the immediately preceding cycle of communication between the remotes and the base.

It is a still further object of the present invention to provide an improved system for radio communications between a base and a plurality of remote units which implements a cyclic communication protocol which improves reliability by use of polarization diversity and which requires only a single antenna at the remote and a pair of antennas, in polarization diversity relationship at the base, to transmit to the remote with the same polarization as the optimum signal received by the base from that remote upon the previous cycle (upon the immediately prior reception of signals from that unit) thereby accommodating changes in polarization as the remotes move to different locations relative to the base.

It is a still further object of the present invention to provide an improved system for wireless data communications of data messages between a base station and a compliment of remote units which exchange messages with the base and which does not require any collision-sensing algorithm and does not require complex collision detection multiple access (CDMA or CSMA) facilities which limit the range of such systems, i.e., the distance away from the base station and from each other which the remote units are limited to maintain communications there between for collision-avoidance purposes.

Briefly described, a data communication system in accordance with the invention provides for the collection of data messages at a base station from a plurality of remote portable data collection units, which base station and remotes have wireless transmitting and receiving capability. The system implements a protocol of broadcasting from the base station a plurality of successive cycles of successive messages addressed to different ones of the units. The base station has means for receiving a cycle of successive response messages (responses) from the units and for changing the rate at which the messages are provided from the base station and the duration of the cycles in accordance with the response messages, and also the absence or presence of such messages, thereby maximizing the speed and rate of collection of the data messages at the base station.

The diversity polarization, reliability enhancement feature of the invention, enables the remote units to have a single antenna and a single channel receiver and transmitter which transmits a signal, preferably having a carrier such as a frequency shift keyed or modulated (FSK) carrier, where the frequency of the signal represents complementary binary values. The base station utilizes a dual channel receiver and a single channel transmitter which broadcasts the messages to the remote units via different ones of the antennas. The system is operative to select one or the other of the antennas. When a remote unit transmits its message on a cycle of message transmissions, the polarization which resulted in the strongest signal controls the selection of antennas when that remote signal is to be polled on the next successive cycle. As a remote unit moves about the area (e.g., within a building) where data is to be collected, as by reading bar codes on labels in different parts of the area, the path over which the signal propagates between that remote unit and the base station can change and can experience different numbers of reflections from walls or other surfaces of different conductivity. Accordingly, the polarization of the signal from the remote to the base or vice versa is likely to change, but only after the remote has moved between different positions. It is unlikely that the remote has moved significantly between successive cycles of data interchange between the base and the remote. Thus, by utilizing the same antenna for transmission to each of the remotes which resulted in the strongest signal received by the base, maximum benefit can be obtained from polarization diversity without significantly increasing the complexity of the system and without at all changing the design of the remote units.

The foregoing and other objects, features and advantages of the invention, as well as a presently preferred embodiment thereof, will become more apparent from a reading of the following description in connection with the accompanying drawing in which:

BRIEF DESCRIPTION OF THE DRAWINGS

FIG. 6 is a chart showing a matrix of data locations in memory (RAM) of the base station control computer; and .

DESCRIPTION OF THE PREFERRED EMBODIMENT

Figure 1:
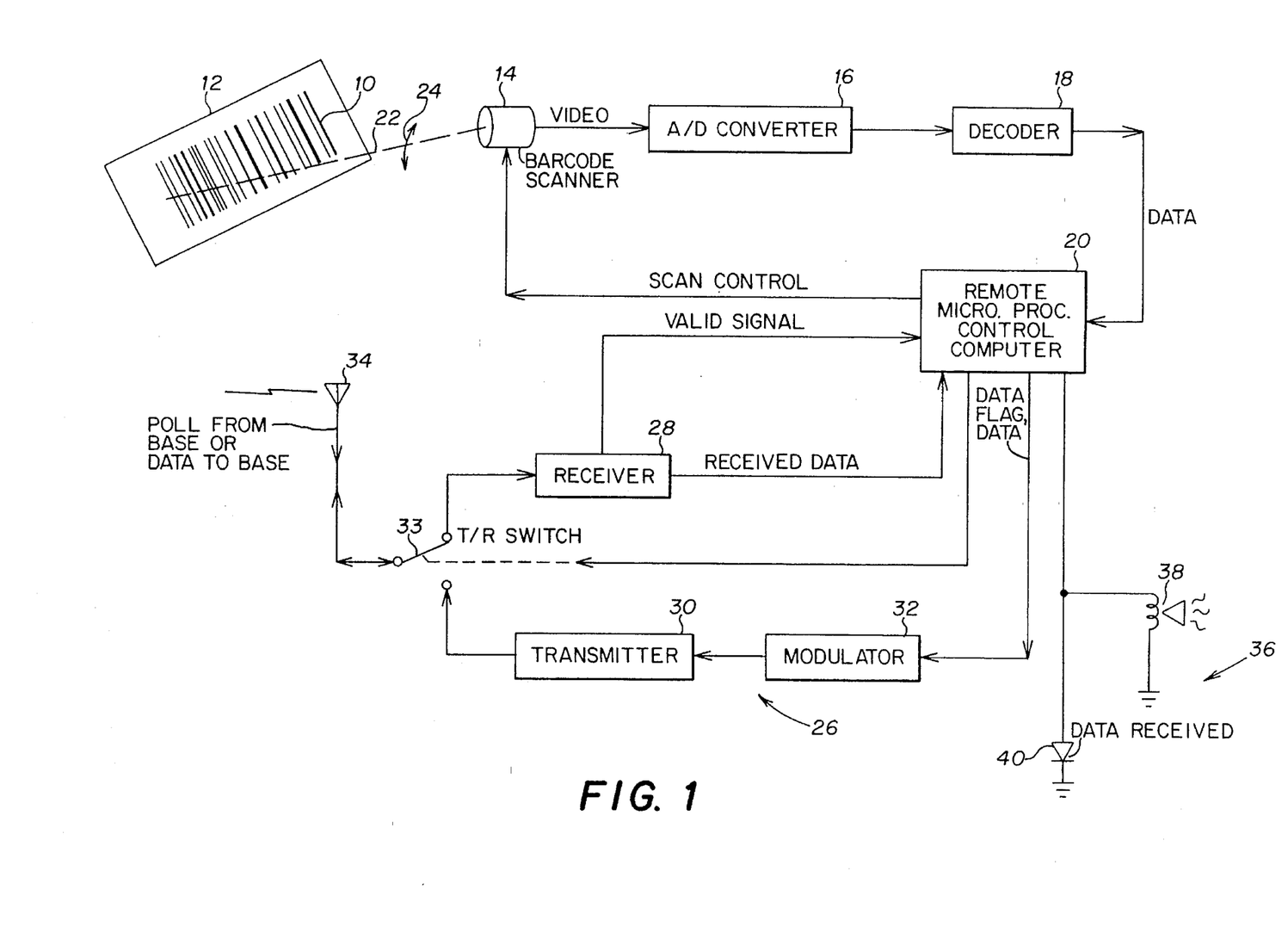
FIG. 1 is a block diagram of a remote unit which is used in a system in accordance with a presently preferred embodiment of the invention.

Referring to FIG. 1, there is showing a typical bar code 10 on a label 12 which may be attached to an item and identifies that item. The data representing the item is obtained by a terminal such as a bar code scanner. The bar code scanner 14 may be of the type manufactured and sold by PSC, Inc. of Webster, New York, U.S.A, their model 5300. Such a bar code scanner is described in issued U.S. patents, such as U.S. Pat. No. 5,260,554, issued to S. Grodevant on Nov. 9, 1993. The scanner 14 provides bar code video signals which are digitized, as by an analog to digital converter 16 or by the digitizer circuit shown in the above referenced Grodevant patent. The digitized signal is coded in a decoder 18 to provided serial binary data, for example, representing the bar code 10. This data is inputted into a microprocessor control computer 20 in the remote unit. The control computer 20 exercises several functions. It may include a scan control signal for enabling the bar code scanner to scan its beam (a laser beam 22) across the code 10 in the directions indicated by the arrow 24, when the label 12 comes into proximity of the scanner. This scan control operation is furnished by PSC, Inc. as its AUTOSENSE® control for bar code scanners and is described in the above-identified patent to S. Grodevant.

The wireless, radio communications features are provided by a transceiver 26 including a receiver 28 and transmitter 30 and modulator 32. The transmitter and modulator provide FSK transmission where a carrier is moved between different frequencies to represent different binary bits of a message. A preferred FM transmitter is available as an integrated circuit chip from Motorola Semiconductor, of Phoenix Ariz., USA, their part MC-2833. The output frequency may in this preferred embodiment be in the VHF band, for example, 27 MHz and be of relatively low power so that government licensing is unnecessary. Such a low power transmitter has been found to be sufficient to cover a sufficient area for remote collection of data from bar code scanners in typical applications such as in warehouses and factories.

The receiver, which is preferably used in this embodiment of the invention, is also available as an integrated circuit chip from Motorola Semiconductor, Phoenix, Ariz., USA, their part No. MC-3363, which is a dual conversion, single channel VHF/FM, narrow band receiver also operating at the same frequency as the transmitter, 27 MHz in this example. The receiver 28 and the transmitter are connected to a single antenna 34 via a transmit receive (T/R) switch 33 which is controlled by a control signal from the computer 20. The messages, are either data or data flag message when the remote unit is ready to transmit a bar code data message to the base station. Polling messages from the receiver 28 constitute received polling data and are also inputted into the control unit 20. The receiver outputs a valid signal (a level which may be one polarity rather than another or ground) to the computer 20 when the strength of the received signal is sufficient (both amplitude and duration is sufficient) to distinguish it from noise. The received data is not utilized without the valid signal output being of proper level. The T/R switch 33 is normally in its receive position as shown in FIG. 1. The computer provides the data flag or data message response to the modulator and operates the T/R switch 33 to its transmit position so that the response message can be transmitted to the base station.

The base station also provides polling messages addressed to the remote unit to acknowledge the receipt of valid data messages. Then the control computer operates an annunciator 36 which may include an audible signal generator and speaker 38 and a data received indicator LED (Light Emitting Diode) 40.

Figure 2:
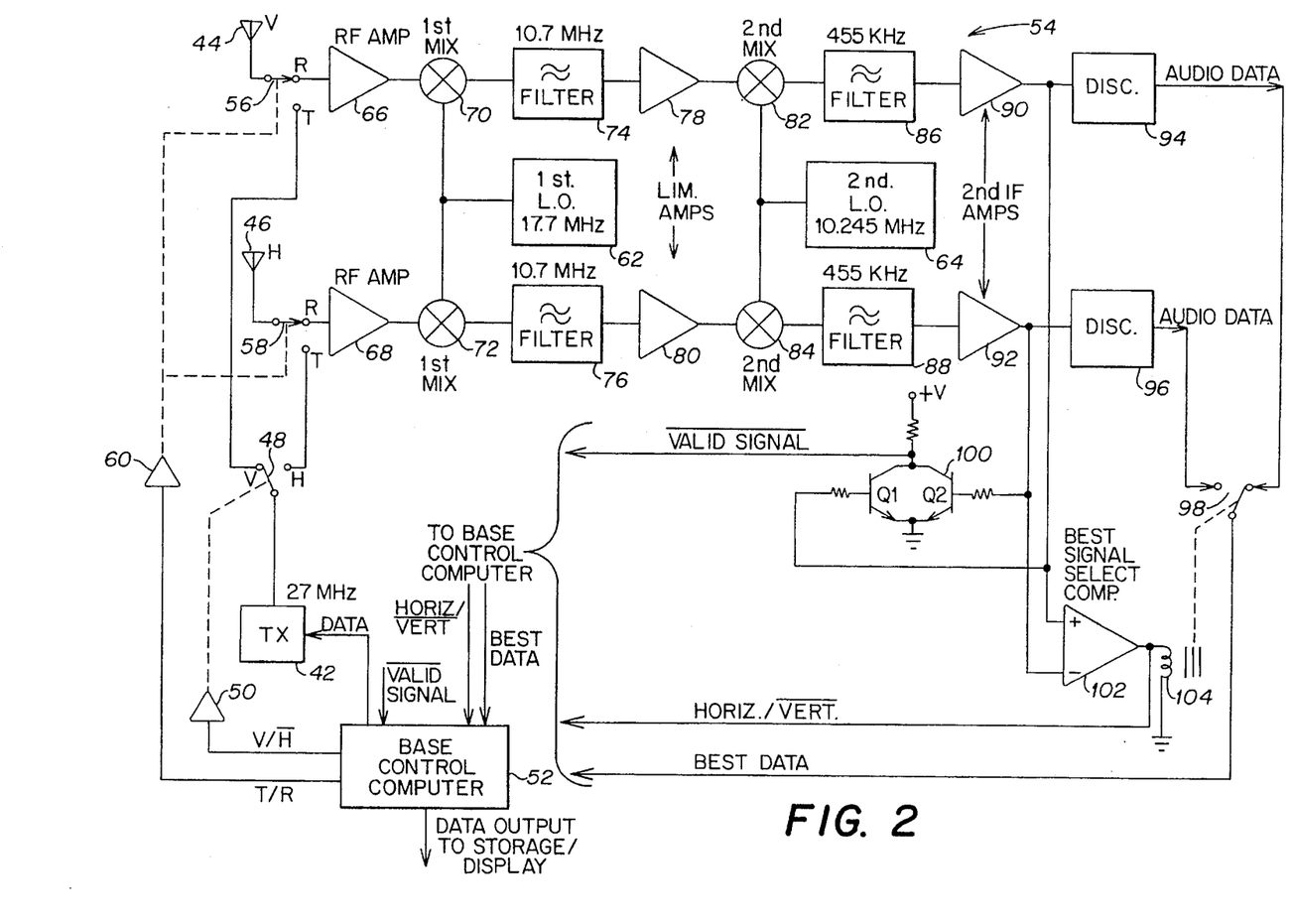
FIG. 2 is a block diagram of the base or central station of the system.

Referring to FIG. 2, the base station has a transmitter and modulator 42 which may be an FSK transmitter like the transmitter and modulator 30 and 32 in the remote units. The transmitter is connected to one or the other of a pair antennas 44 and 46 which are in polarization diversity relationship, by which is meant that one antenna may be polarized in one direction, say vertically (V) while the other is polarized to receive and transmit signals in orthogonal direction (say, horizontally) (H). The antennas are selected through the use of a V/H switch 48 which is operated through a driver 50 from a base control computer 52. The switch 48 and the driver 50 may be a solid state device available as an integrated circuit chip or the switch may be driven electromechanically by the driver 50.

The antennas are connected either to the transmitter 48 or to different channels of a dual-channel, double conversion, superhetrodyne, FM receiver 54 via TR switches 56 and 58. These switches are operated by a T/R signal from the control computer 52 via a driver 60. The TR switches 56 and 58 may normally be in the receive position connecting the antennas 44 and 46 to the receiver 54 and are switched to the transmit position when the base station has messages, such as polling messages to transmit.

Each channel of the receiver may be identical and each is tuned to 27 MHz in this example. Common first and second local oscillators 62 and 64 are used so as to ensure that the receivers are tuned to the same frequency. The components of the receivers include input RF amplifiers 66 and 68, and first mixers 70 and 72 connected to the first local oscillator 62. Each channel includes its own lower side band, first I.F. filter 74 and 76 followed by limiter amplifiers 78 and 80. The limited signal is applied to second mixers 82 and 84 which received the second local oscillator 64 signal as a mixing input. The local I.F. is selected by filters 86 and 88. The output signals are amplified by second I.F. amplifiers 90 and 92. The data which is at an audio, rather than an RF or I.F., rate is detected by discriminators 94 and 96 and the strongest signals from one or the other of the polarization diversity antennas and its channel is selected by a switch 98.

Each channel of the receiver 54 may be a separate Motorola semiconductor integrated circuit chip part number MC3363 as used in the remote units. These units may utilize the output which goes into their discriminator after limiting and detection (the meter drive output available on pin 12 of the MC3363 integrated circuit or chip) to provide the valid signal output from the receiver 28 in the remote units (FIG. 1) and also to provide outputs to an OR circuit 100 having two NPN transistors which become conductive (on) when a valid signal output appears, namely the carrier is detected at the outputs Of the second IF amplifiers 90 and 92 of either channel. Then a not valid signal line which is high (plus voltage) becomes low (ground), and the complement of the valid signal level is applied to the base control computer 52 indicating that there is communication with the remote unit then transmitting (a response is received from a remote unit which has been polled).

The signals from both channels are also applied to a comparator 102 which selects which signal is strongest. This comparator drives what is schematically illustrated as the operating winding 104 of a relay, which outputs the best data-that is the data received on the channel which has handled the strongest signal. The comparator 102 and relay 104 and its switch 98 may be implemented by a solid state Schmidt trigger circuit having hysteresis so that the switching contacts 98 stay in the position selected for the strongest signal, on one channel, until the other channel produces a stronger signal. The comparator 102 provides an output which is high or low depending upon whether the channel connected to the H or horizontal antenna or the V or vertical antenna is the strongest. This output (horizontal/not vertical) together with the best data output are applied to the base control computer. The horizontal/not vertical output is stored and on the next polling cycle the polling data which is supplied to the transmitter 42 from the computer 52 is transmitted using the same antenna as received the strongest signal. The switching is carried out by the switch 48 which connects the transmitter output to one of the antennas 44 and 46 rather than the other. This switch is driven by the driver 50 from the V/not H outputs from the computer 52. The T/R switches 56 and 58 are also then switched to the T or transmit position so that the selected one of the polarization diversity antennas transmits to the remote unit on the same antenna which received the strongest signal from that unit. The data output, that is the messages which are received from the remote units, may be used in the computer to operate a display or stored in the computer and outputted to other data processing facilities which use the data collected at the base station from the remote units.

Figure 5:
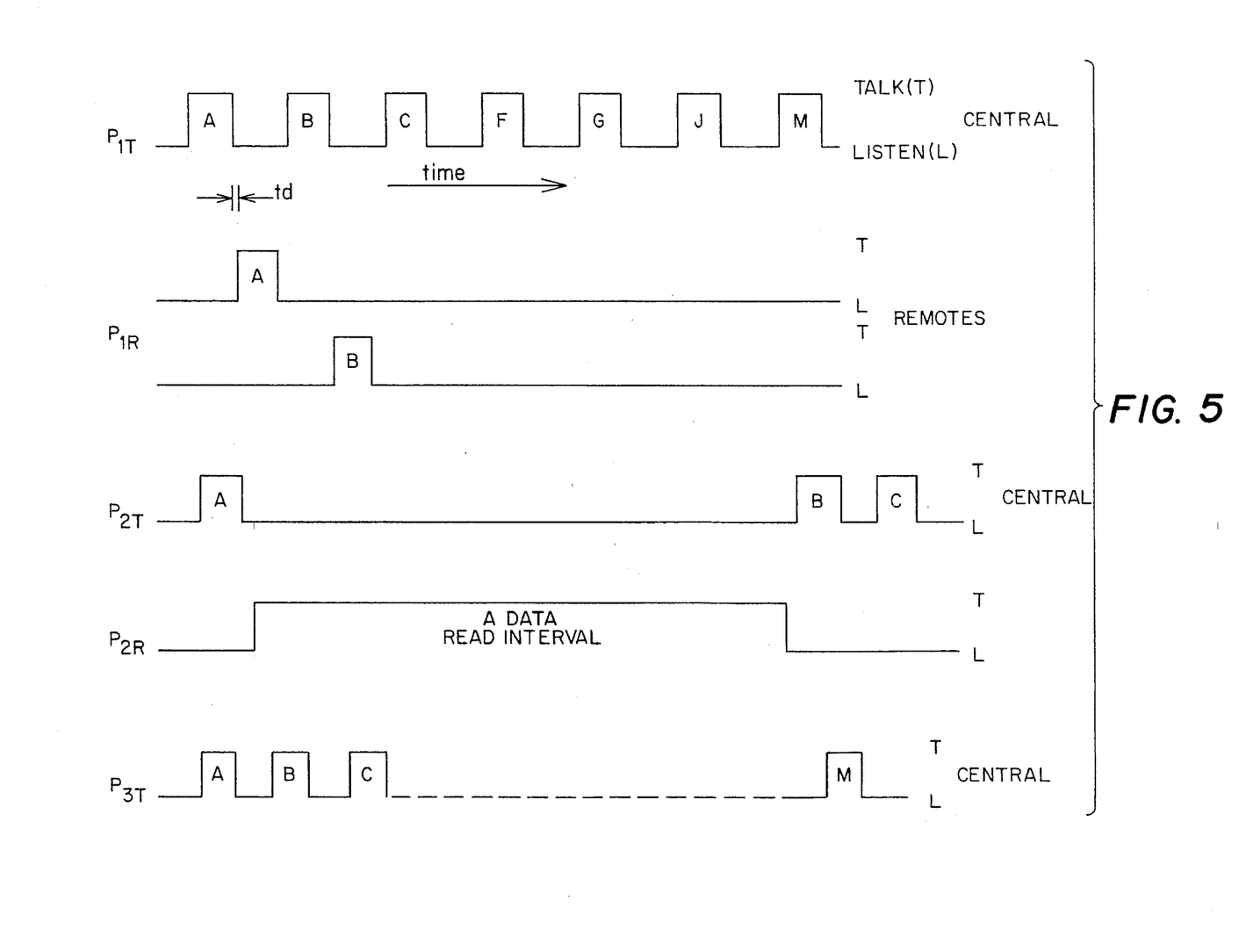
FIG. 5 is a timing diagram illustrating typical cycles of polling and response signals which are generated in the operation of the presently preferred embodiment of the invention.

Referring to FIG. 5, there is shown a plurality of cycles where data is exchanged between the base station and the remote units for polling message transmissions and acknowledgments, which protocol is robust and minimizes the time for collection of data from all of the units. In the example there are 13 remote units A–M. The lines of the diagram are coded so that $P_{1T}$ means polling transmissions on the first cycle, $P_{1R}$ means the first cycle of responses or the second cycle in the total interchange, $P_{2T}$ is the transmission from the base station on the second polling cycle and $P_{2R}$ is the cycle of responses when data from the remote units which have collected data are transmitted to the base station-and collected there together with data from any other units, i.e., this transfer occurs during the $P_{2R}$ cycle. $P_{3T}$ is the third polling cycle or the fifth cycle which constitute the set of cycles which is used to complete an interrogation of all of the remote units and the collection of data therefrom. The $P_{3T}$ cycle transmits polling signals successively with each successive polling signal addressed to a different remote unit and codes these polling signals so as to acknowledge that data is received and is valid.

Not all of the compliment of remote units is polled. Only those units which are active continue to be polled. In the $P_{1T}$ cycle units A, B and C are polled. Units D and E are inactive. The polling message for unit F then replaces the polling message which would have been sent to unit D. Similarly, all of the remaining active units move up, replacing those that are inactive. It is desireable every number of cycles to poll all of the units whether active or inactive so as to update the condition of the system and to pick up data from units which have changed from inactive to active state.

Figure 7:
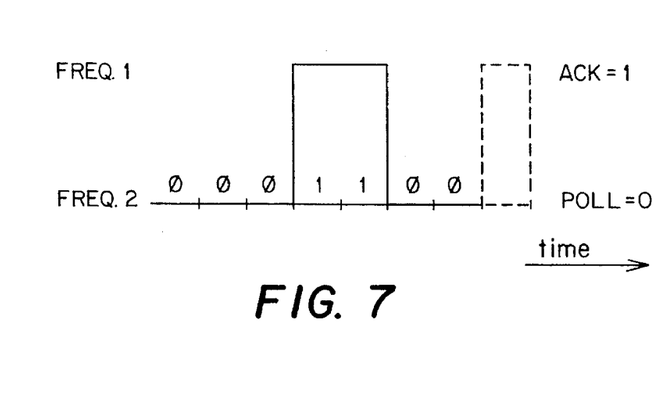
FIG. 7 is a diagram of a polling message or a reply message which may be exchanged between a remote unit and the base station in response to a polling message on the first of a plurality of cycles of polling messages and exchanges during which data messages are communicated between all of the remote units which are active in the system and the base station so that the data in such messages can be collected at the base station and utilized for storage, display or data processing applications.

FIG. 7 indicates a typical polling message. The carrier shifts between frequencies 1 and 2 to designate binary 1 and binary 0 bits. The last bit is shown in dash lines and coded to represent an acknowledge message, thus the last bit is of F2, frequency 2, (for a binary 0) when it is a polling message as occurs on the $P_{1T}$ cycle or the $P_{2T}$ cycle. On the $P_{3T}$ cycle, the last bit may be set to $F_1$ (frequency 1) when an acknowledge message is transmitted.

The system operates in the second cycle after a time delay or interval (td) to retransmit the same polling signal as the response from the unit. Accordingly, unit A transmits back to the base station the same signal by which it was addressed. Therefore, the base station can recognize that the response is from unit A. Similarly, the other units respond with the same polling signal, as their response message. The response messages will be coded as by setting the last byte to frequency 1 instead of frequency 2, that is to represent binary 1 rather than a binary 0 bit, when the unit has collected data which is ready for transmission. Then on the next polling cycle from the central or base station to the units the data read (RDY) condition is recognized in the base station and a window or read interval is opened which is of sufficient length to allow the bar code symbol message data to be transmitted. This length is set in software (the program of the base station computer) to accommodate the longest binary data string for the longest bar code which is expected to be read. The next polling message is delayed until after the read interval. Thus, the $P_{2T}$ cycle is constituted of messages which are transmitted at a variable rate by the base station and the length of the $P_{2T}$ cycle depends upon the number of remote units which have data available for transmission. The data read interval is much longer than the interval between polling messages on the first or $P_{1T}$ cycle or even on the acknowledgement or $P_{3T}$ cycle. The intervals between the polling messages on the $P_{1T}$ and $P_{3T}$ cycles may be substantially equal. Also the interval between polling messages on the $P_{2T}$ cycle, when the previous remote unit did not have data to transmit is short and may be about equal to the interval between the polling messages on the $P_{1T}$ and $P_{3T}$ cycles. Accordingly, the optimum fast rate of polling is used and the rate varies dynamically depending upon the traffic in the system.

Figure 6:
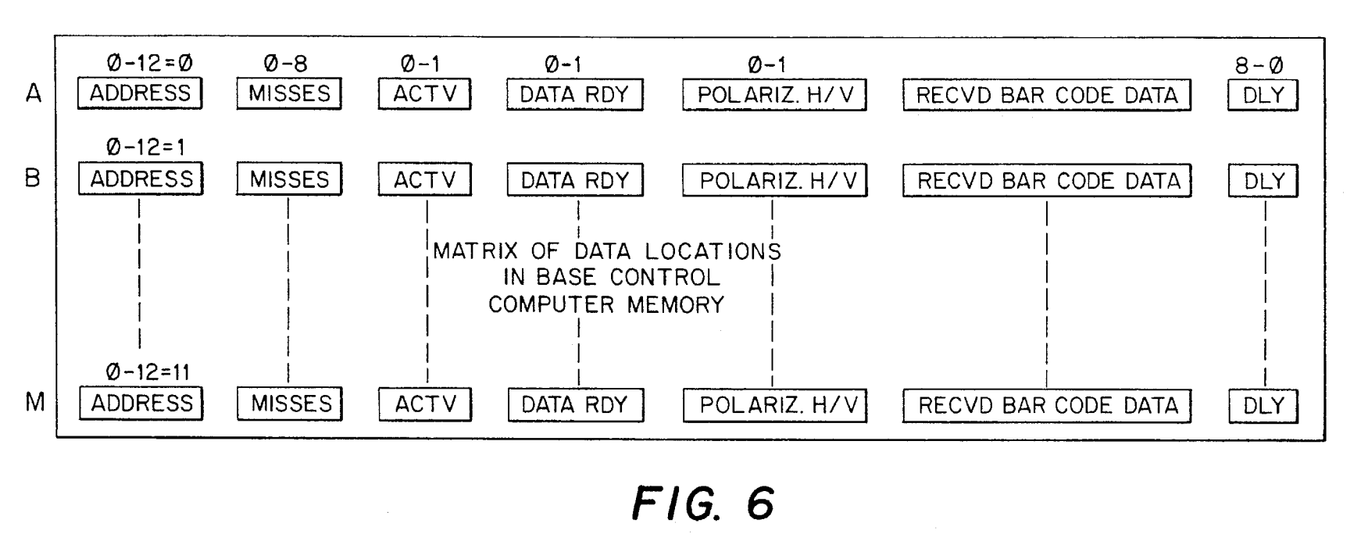

Referring to FIG. 6, the base station control computer 52 has a memory, in different locations of which there is stored control signals and data which govern the operation of the system and including data messages, which are received and held for further processing or display. One column of locations contains the address corresponding to each of the remote units A–M. Another set of locations is for a count indicated as DLY or delay. This is the count of cycles, such as the polling and response cycles $P_{1T}$, $P_{1R}$, $P_{2T}$, $P_{2R}$ and $P_{3T}$ shown in FIG. 5 during which it is desireable to maintain the unit inactive after it has transmitted a data message in order to speed the data transfer rate by eliminating that unit from being polled while it is not likely that the unit will collect another data message (scan another bar code at a different location). Another set of location is a count of misses, that is where response messages such as the $P_{1R}$ messages shown in FIG. 5, which fail to be received and the valid signal line is low indicating that no valid signal in response to a poll was received. Unless the count in the misses location is reset, which occurs upon receipt of a valid signal on a poll, after a number of polls, 9 being shown by way of example, the unit will be considered inactive, for example when turned off by the operator. The active or inactive state of the units are indicated by the column of ACTV locations. Data RDY conditions of the channels are indicated by the value of the bits stored in the data RDY locations. The polarization for maximum signal strength, either H or V from the horizontal or vertical antennas 46 and 44 (FIG. 2), is stored in the Polarize H/V series of locations. The memory has sufficient locations to store data messages (the decoded bar code data) from each of the units. The RECVD BAR CODE DATA blocks represent the locations where data collected on a set of cycles $P_{1T}$ through (FIG. 5) is found.

Figure 3:
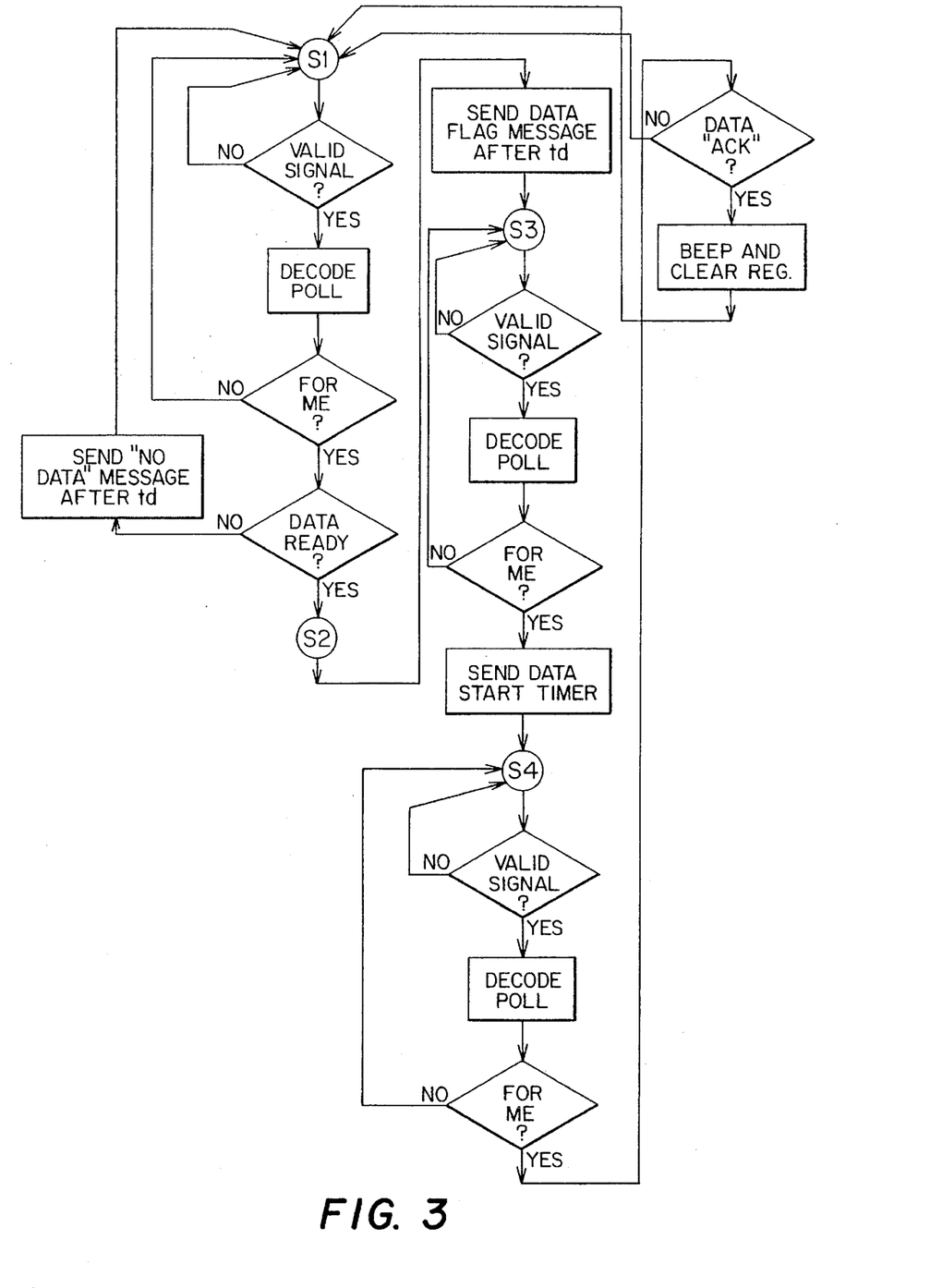
FIG. 3 is a flowchart illustrating the programming of a microprocessor control computer which is used in each remote unit.

Referring to FIG. 3 there is shown a flowchart representing the programming of the computer 20 in each of the remote units. The circles labelled S1, S2, S3 and S4 represent nodes in the program.

Considered that the first cycle of polling messages is being broadcast to the remote units, the first decision is whether a valid signal has been received. This is determined from the valid signal output of the receiver 28 (FIG. 1). The valid signal condition must exist before any further action is taken during any state of the program.

Next the polling message is decoded and the decision is determined if the message is for this remote unit or "for me". If the polling message addresses that unit, the computer then examines whether data is ready for transmission to the base station. Then the computer assembles either a send no data message or a send data message with a flag represented by the last bit position of the message being set (transmitted at frequency 1) (see FIG. 7 and the discussion thereof above). The program loops through the various blocks between S1 and S2 until, on a particular polling cycle, the unit has collected data for transmission and the data flag message is set after the td timed delay.

In the next state starting with S3, the next polls, which occur on the data collection cycle or $P_{2T}$ in FIG. 5, take place. The valid signal is tested and the polling message is decoded both as to whether the message is for this remote unit and whether or not the data flag message has been received. If the data flag message has been received and is stored in the memory matrix (FIG. 6), the send data timer is set and the data message is transmitted from the remote unit by modulating the carrier generated by the transmitter 30 with the modulator 32. See FIG. 1.

For the acknowledgement polls, starting with S4, a valid signal condition is determined and the polling message is decoded. The acknowledge bit or flag is detected and if it is present, the acknowledgement is recognized. Then the annunciator 36 produces a beep and the LED is lit. The register in the computer 20 which stores the flags and the acknowledgement data is cleared and the system loops back to the first node S1.

Figure 4:
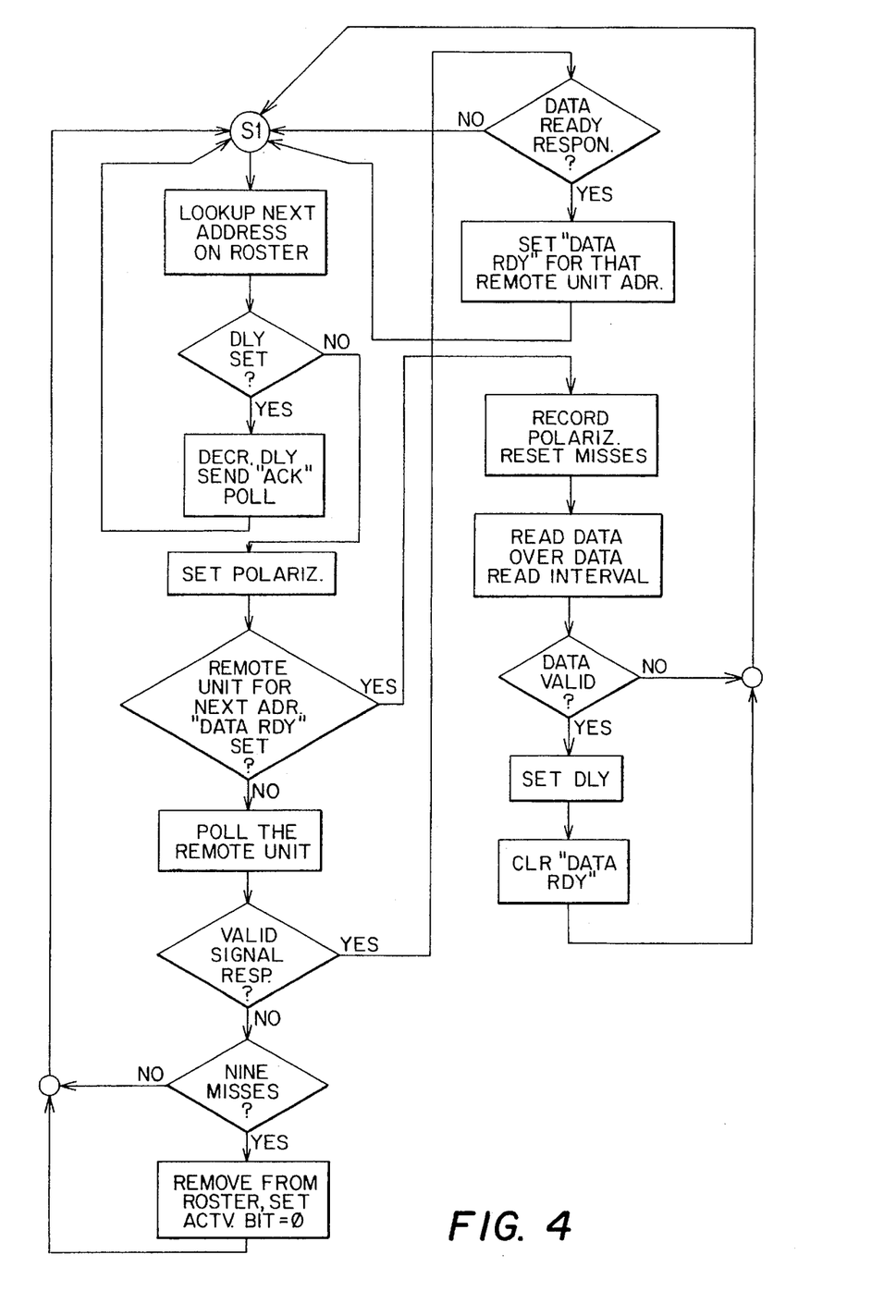
FIG. 4 is a flowchart illustrating the programming of the base station control computer, which may also utilize a microprocessor.

Referring to FIG. 4, it will be apparent how the control computer 52 in the base station (FIG. 2) is programmed. The node S1 starts the program. The addresses of the remote units are looked up successively, the address locations in the memory (FIG. 6) may be considered to be a roster of these M addresses. Then the DLY location for the address (the next address which has just been looked up on the roster) is checked to see if it is set. If the delay is set, it is taken that a data message from the remote unit corresponding to that address has been received. Thus, on that poll and any subsequent poll for a number of polls, for example, 9 polling cycles as indicated on the matrix in FIG. 6, the acknowledgement bit is set in the polling message and the remote unit for that address is deemed to be inactive.

If the delay count is no longer set, but rather is clear, the polarization is set, that is the polarization data as determined on the HOR/not VERT line from the comparative 102 is checked and the best signal corresponding to the proper polarization is stored in the Polarize H/V location for that address in the memory (FIG. 6).

Then, the polling message is assembled as the data to the transmitter 42 and is transmitted. A valid signal response is then required. The program proceeds if the signal is valid to test whether the response message had its flag bit set to indicate a data RDY condition. Then the data RDY byte for that address is set and the data is received from the remote unit at the address.

Alternatively, if the remote unit for the next address already had its data RDY location set, then the polarization data (HOR/VERT) as received for that address is stored and the data is read over the data read interval. If the data is valid, as may be determined by the usual parity checks and the presence of all of the bytes of the message, then the delay is set to indicate that this unit has already transmitted its data and will be inactive for a predetermined number of cycles. The data RDY count location for that address is also cleared and the system recycles back to S1 and the next unit for the next address is polled.

Returning to the point in the program where a valid signal response is not received on a poll, the misses count is incremented. If there are 9 misses the remote unit is removed from the roster. This is done by setting the activity bit (ACTV) to 0 to indicate that the unit is off. The misses count is reset any time the data RDY output appears. This occurs periodically, say every few minutes when the activity byte for each address is reset to one and a poll of all of the units is conducted by sending polling messages thereto. Accordingly, the system operates continuously to collect data when such data exists and changes the polling rates and the periods of the polling cycles, depending upon the traffic in the system, From the foregoing description it will be apparent that there has been provided an improved data collection system especially suitable for collection of data at a central or base station by using a polling protocol which is dynamic as well as robust and also utilizing polarization diversity reception to enhance the reliability of data collection. Variations and modifications in the herein described system, within the scope of the invention, will undoubtedly suggest themselves to those skilled in the art. Accordingly, the foregoing description should be taken as illustrative and not in a limiting sense.

I claim:

1. A system for collecting data messages from a plurality of data collection units at a base station comprising:

a means for individually polling, at a certain rate, certain of said individual units from said base station on each of a plurality of successive polling cycles, to determine which of said certain of said individual units have data messages available to transmit to said base station, wherein each cycle has a duration; and a means in said base station for receiving poll response messages from certain of said individual units after they are polled representing that certain of said individual units have data messages which are available for transmission to said base station, and a means in said base station for changing the rate of polling, and a means for changing the duration of said cycles depending upon the poll response messages received from said units.

2. The system according to claim 1 further comprising a means for rendering those of said units which have transmitted data messages inactive, for a certain number of said plurality of successive cycles occurring after the cycle during which said units have transmitted their said data messages to said base station.

3. The system according to claim 2 further comprising means for rendering those of said units inactive, from which poll response messages have not been received at said base station for a certain number of said successive cycles.

4. The system according to claim 3, wherein said units are remote portable bar code scanner readers having a means for reading bar codes and transmitting data representing said bar codes, to said base station, in the form of said data messages.

5. The system according to claim 1 wherein said changing means includes means for decreasing the rate at which said individual units are polled from said base station during one of said cycles, during which said data messages, sent from certain of said individual units, are collected at said base station from said units by increasing the interval between successive poll messages addressed to certain of said individual units when a poll response message from the unit which is polled represents that said unit has a data message ready for collection by said base station.

6. The system according to claim 1 wherein said changing means includes a means for increasing the rate at which certain of said different individual units are polled from said base station by replacing poll messages of units which are inactive with poll messages addressed to those of units which are active.

7. A method of collecting data messages at a base station from a plurality of remote portable data collection units, which base station and units have wireless transmitting and receiving capability, said method comprising steps of:

broadcasting at a certain rate, from said base station a plurality of successive cycles of successive poll messages, to determine which individual units have data messages to transmit to said base station, wherein each individual poll message is addressed to a different individual, and said rate consists of the frequency with which a poll message addressed to an individual unit is broadcast during an interval of time and wherein each cycle has a duration;

collecting at a certain speed and time, by said base station, a cycle of successive poll response messages sent from certain of said individual units in response to said poll messages, indicating that said certain of said individual units have data messages to transmit to said base station during a subsequent cycle, and changing the rate at which said poll messages are broadcast from said base station and changing the duration of said cycles in accordance with said poll response messages thereby minimizing the time for collection of said poll response messages at said base station.

8. The method according to claim 7 wherein said changing step is carried out to increase the rate at which said poll messages are provided by said base station by replacing poll messages addressed to those of said individual units which are inactive with poll messages addressed to those of said individual units which are active.

9. The method according to claim 8 further comprising the step of rendering inactive, units which have transmitted data messages to said base station for a certain number of said plurality of successive cycles occurring after the cycle during which said units have transmitted their said data messages to said base station.

10. The method according to claim 8 further comprising the step of rendering inactive those of said units from which poll response messages have not been received at said base station for a certain number of successive cycles.

11. The method according to claim 7 wherein said rate changing step is carried out to decrease the rate at which said poll messages are provided by said base station during one of said cycles during which said data messages, sent from certain of said individual units, are collected at said base station by increasing the interval between successive poll messages addressed to individual units when a poll response message from the unit to which the first of said successive poll messages to that unit represents that said unit has a data message ready for collection by said base station.

12. The method according to claim 7 wherein said base station wireless transmitting and receiving capability includes a pair of receiving channels having antennas in polarization diversity relationship and said method further comprises a step of:

identifying on each of said cycles, the one of said pair of channels from which said poll response messages from said certain of said individual units is received with greater strength than from the other of said pair of channels, and wherein said broadcasting step for said poll messages addressed to certain of said individual units on the next of said plurality of cycles is carried out with the one of said pair of antennas of the channel in which said poll response messages are received with greater strength.

13. A method of collecting data messages at a base station from a plurality of remote portable bar code scanner units which comprises steps of:

individually polling, at a certain rate, certain of said individual remote portable bar code scanner units on each of a plurality of successive polling cycles, wherein each cycle has a duration, and receiving poll response messages from certain of said individual remote portable bar code scanner units after each is polled, said poll response messages representing that the certain of said individual remote portable bar code scanner units have data messages which are available for transmission to said base station, and changing the rate of polling and changing the duration of said cycles depending upon the poll response messages received from said remote portable bar code scanner units.

14. The method according to claim 13 further comprising the step of:

rendering those of said remote portable bar code scanner units which have communicated data messages inactive for a certain number of said plurality of successive cycles occurring after the cycle during which said certain of said individual remote portable bar code scanner units have communicated said data messages to said base station.

15. The method according to claim 14 further comprising the step of rendering those of said remote portable bar code scanner units inactive from which poll response messages have not been received at said base station for a certain number of said successive polling cycles.

16. The method according to claim 13, wherein said changing step is carried out to decrease the rate at which certain of said individual remote portable bar code scanner units are polled by said base station, during one of said cycles during which said data messages are collected at said base station, by increasing the interval between successive poll messages addressed to certain individual remote portable bar code scanner units when a poll response message from one of said certain of said individual remote portable bar code scanner units which is polled represents that said remote portable bar code scanner unit has a data message ready for collection by said base station.

17. The method according to claim 13 wherein said changing step is carried out to increase the rate at which said certain of said remote portable bar code scanner units are polled by said base station by replacing poll messages addressed to those of said remote portable bar code scanner units which are inactive with poll messages addressed to those of said remote portable bar code scanner units which are active.

18. A method of collecting data messages at a base station from a plurality of remote portable data collection units by wireless communication between said base station and said units which comprises the steps of:

broadcasting from said base station a first cycle of successive poll messages, wherein each poll message is addressed to a different individual remote unit, said poll messages being spaced in time from each other by first intervals, transmitting during said first intervals, from each individual remote unit, in response to said first cycle of successive poll messages, a second cycle of poll response messages, wherein each poll response message identifies a different individual unit and whether or not data messages are ready for transmission to said base station therefrom, and broadcasting from said base station to said individual units a third cycle of successive poll messages which are separated by second intervals, wherein said third cycle of poll messages are addressed only to those individual units from which the poll response messages during said second cycle represented that said units were ready to transmit said data messages to said base station, and wherein during said second intervals in said third cycle, said individual units which received said poll messages transmit their data messages to said base station, where they are collected.

19. The method according to claim 18 further comprising the step of replacing poll messages addressed to those of said units which are inactive with successive poll messages addressed to units which are active.

20. The method according to claim 19 further comprising the step of performing said replacing step for those of said units from which data messages are received for a certain number of said cycles thereby treating said units from which data messages are received as inactive for said certain number of cycles.

21. The method according to claim 19 further comprising performing said replacing step for those of said units from which responses are not received after a certain number of successive broadcasts of poll messages from said base station addressed to said individual units, thereby considering said units as inactive.

22. The method according to claim 18 wherein said first and second intervals are substantially of equal duration.

23. The method according to claim 18 further comprising broadcasting a fourth cycle of poll messages having data representing acknowledgment of collection at said base station of said data messages from said different individual units which transmitted data messages to said base station during said second intervals, said poll messages on said fourth cycle being separated by intervals substantially the same as said first intervals of said poll messages in said first cycle.

24. The method according to claim 18 wherein said base station includes a pair of receiving channels having antennas in polarization diversity relationship and said method includes a step of:

identifying on each of said cycles, for each of said individual units, the one of said pair of channels from which the poll response message from said unit was received with greater strength than from the other of said pair of channels, and said broadcasting step for the poll message addressed to said individual unit on the next of said plurality of cycles is carried out with the antenna for the channel on which said poll response message was received with greater strength on the preceding one of said cycles for said unit.

25. A system for collecting data messages at a base station from a plurality of remote portable wireless data collection units, which comprises:

means for providing wireless transmitting and receiving capability in said base station and said units, means for broadcasting from said base station, at a certain rate, utilizing the wireless transmitting means thereof, a plurality of successive cycles of successive poll messages, to determine which individual units have data messages to transmit to said base station, wherein each individual poll message is addressed to a said individual unit, and said rate consists of the frequency with which a poll message addressed to an individual unit is broadcast during an interval of time, and wherein each cycle has a duration;

means for collecting at said base station, at a certain speed and time, utilizing the wireless receiving means thereof, a cycle of successive poll response messages sent from certain individual units in response to said poll messages indicating that said certain of said individual units have data messages to transmit to said base station during a subsequent cycle, and means in said base station for changing the rate at which said poll messages are broadcast from said base station and changing the duration of said cycles in accordance with said poll response messages thereby maximizing the speed and minimizing the time for collection of said poll response message at said base station.

26. The system according to claim 25 wherein said base station includes a means responsive to the poll response messages from certain of said individual units for detecting whether any of said units are active or inactive, and said changing means includes a means for measuring the rate at which said poll messages are broadcast by said base station by replacing poll messages addressed to those certain of said individual units which are inactive with messages addressed to those certain of said individual units which are active.

27. The system according to claim 26 further comprising means in said base station for rendering inactive units which have transmitted data messages to said base station for a certain number of said plurality of successive cycles occurring after the cycle during which said units have transmitted their said data messages.

28. The system according to claim 26 further comprising means in said base station for rendering those of said units inactive, from which poll response messages have not been received at said base station for a certain number of successive cycles.

29. The system according to claim 25 wherein said changing means further includes means for decreasing the rate at which said poll messages are provided by said base station during one of said cycles during which said data messages, sent from certain of said individual units, are collected at said base station by increasing the interval between successive poll messages addressed to individual units when a poll response message from the unit to which the first of said successive poll messages to that unit represents that said unit has a data message ready for collection by said base station.

30. The system according to claim 25 wherein said means foe providing said base station wireless transmitting and receiving capability further includes:

a pair of receiving channels having antennas in a polarization diversity relationship; and a means for identifying on each of said cycles, for each individual unit, the one of said pair of channels from which the poll response message from said unit was received with greater strength than from the other of said pair of channels, and a means for broadcasting said poll message addressed to said unit on the next of said plurality of cycles including means for applying signals representing said poll message for said unit to the one of said pair of antennas on the channel in which said poll response message was received with greater strength for that unit.

31. The system according to claim 25 wherein said portable data collection units are bar code readers and include a means for reading bar codes and a means for transmitting data representing said bar codes in the form of said data messages.

32. A system for collecting data messages at a base station from a plurality of remote portable data collection units, comprising:

wireless communications capability between said base station and said remote portable data collection units, means for broadcasting, at a certain rate, from said base station a first cycle of a plurality of successive individual poll messages, wherein each individual poll message is addressed to a different individual remote portable data collection unit, said poll messages being spaced in time from each other by first intervals, means for transmitting poll response messages from said remote portable data collection units, in response to said first cycle of a plurality of successive poll messages, wherein each said poll response message identifies a certain one of said individual units and whether or not a data message is ready for transmission to said base station from said unit, and each poll response message for each individual unit is transmitted during the first interval, following the poll message addressed to that individual unit during said first cycle, and means for broadcasting from said base station a third cycle of successive poll messages, which are separated by second intervals, and wherein said third cycle poll messages are only broadcast to an individual unit if the poll response message received by the base station for that individual unit on said third cycle represented that said unit was ready to transmit data messages to said base station, and wherein said second interval provides an interval for transmission of said data messages from said units between said polling messages of said third cycle.

33. The system according to claim 32 further comprising a means in said base station for replacing successive poll messages addressed to those of said individual units which are inactive with successive poll messages addressed to individual units which are active.

34. The system according to claim 33 further comprising a means for operating said replacing means for those of said individual units from which data messages are received at said base station, wherein said poll messages are replaced for said units for a certain number of said cycles, thereby treating said units from which data messages are received at said base station as inactive for said certain number of cycles.

35. The system according to claim 33 further comprising means for operating said replacing means for those of said units from which poll response messages are not received at said base station, wherein said poll messages are replaced for those non-responsive units after a certain number successive transmissions of poll messages from said base station addressed to said non-responsive units, thereby considering said units as inactive.

36. The system according to claim 32 wherein said first and third cycles are substantially of equal duration.

37. The system according to claim 32 further comprising means for broadcasting a fourth cycle of poll messages having data representing acknowledgment of collection at said base station of said data messages from different ones of units to which said fourth cycle of poll messages are addressed, said poll messages on said fourth cycle being separated by intervals substantially the same as polling messages on said first cycle.

38. The system according to claim 32 wherein said base station includes a pair of receiving channels having antennas in polarization diversity relationship and said system includes means for identifying on each of said cycles, for each of said individual units, the one of said pair of channels from which responses from said unit was received with greater strength than from the other of said pair of channels, and said means for broadcasting the poll message addressed to said unit on the next of said plurality of cycles includes a means for applying signals representing said messages to the antenna for the channel on which the poll response message was received with greater strength on the preceding one of said cycles for said unit.

39. The system according to claim 32 wherein said portable data collection units are bar code readers having means for reading bar codes and transmitting data representing said bar codes, to said base station, in the form of said data messages.

40. A method of collecting data messages at a base station from a plurality of remote portable data collection units, which base station and units have wireless transmitting and receiving capability, said method comprising the steps of:

(a) broadcasting from said base station a first plurality of successive poll messages in a sequence, wherein each individual poll message is addressed to a different individual unit, to determine which units have data messages available to transmit to said base station;

(b) responsive to said broadcasting of said first plurality of successive poll messages, collecting at said base station, poll response messages sent from each individual unit that has a data message available for transmission to said base station;

(c) broadcasting from said base station a second plurality of successive poll messages to each individual unit which responded with a poll response message in step (b), to prompt those units to each transmit a data message to said base station;

(d) responsive to said broadcasting of said second plurality of successive poll messages, collecting at said base station, data messages sent from each individual unit that had a data message available for said base station, said data messages being sent from each individual unit in response to each poll message broadcast in the step (c), repeating steps (a)–(c) successively; and altering the polling sequence of said step (a) so as to alter the time it takes to complete steps (a) through (c).

41. The method according to claim 40 wherein said steps of collecting at said base station said poll response messages and said data messages include the steps of collecting said messages by a pair of antennas in polarization diversity relationship with each other.

42. The method according to claim 40 wherein said altering step includes broadcasting in a successive step (a) only to individual units from which poll response messages were received in a previous step (b).

43. The method according to claim 40 wherein said altering step includes broadcasting in a successive step (a) only to individual units which did not send data messages in a previous step (d), for a certain number of successive steps (a).

44. The method according to claim 40 wherein said broadcasting step (a) includes broadcasting from said base station a first plurality of successive poll messages in a sequence, wherein each individual poll message is addressed to a different individual remote bar code scanner unit.

45. A bar code data acquisition system comprising:

a plurality of remote portable bar code scanner units, each unit having wireless transmission and receiving communications capability; and a base station having wireless transmission and receiving communications capability for communication with said plurality of remote portable bar code scanner units, said base station includes a pair of antennas in polarization diversity relationship to one another, and a pair of receiving channels wherein one receiving channel connects to one of said pair of antennas and the other receiving channel connects to the other of said pair of antennas;

wherein said base station connects one of said pair of antennas to transmit to said remote portable bar code scanner units.

46. The bar code data acquisition system according to claim 43, further comprising a means for identifying which one of said pair of antennas received a signal transmitted from said portable remote bar code scanner units strongest, and selecting said antenna and corresponding channel for subsequent transmission and receiving communications between said base station and said portable remote bar code scanner unit.

* * * * *